United States Patent
Van Erp (10) Patent No.: US 9,504,115 B2
(45) Date of Patent: Nov. 22, 2016

(54) LIGHT SOURCE CIRCUITRY FOR CONTROLLING THE COLOR OF EMITTED LIGHT

(71) Applicant: KONINKLIJKE PHILIPS N.V., Eindhoven (NL)

(72) Inventor: Josephus Adrianus Maria Van Erp, Asten (NL)

(73) Assignee: KONINKLIJKE PHILIPS ELECTRONICS N.V., Eindhoven (NL)

(*) Notice: Subject to any disclaimer, the term of this patent is extended or adjusted under 35 U.S.C. 154(b) by 0 days.

(21) Appl. No.: 14/400,088

(22) PCT Filed: May 6, 2013

(86) PCT No.: PCT/IB2013/053619
§ 371 (c)(1),
(2) Date: Nov. 10, 2014

(87) PCT Pub. No.: WO2013/171622
PCT Pub. Date: Nov. 21, 2013

(65) Prior Publication Data
US 2015/0108919 A1 Apr. 23, 2015

Related U.S. Application Data

(60) Provisional application No. 61/646,934, filed on May 15, 2012.

(51) Int. Cl.
*H05B 37/02* (2006.01)
*H05B 33/08* (2006.01)

(52) U.S. Cl.
CPC ...... *H05B 33/0857* (2013.01); *H05B 33/0812* (2013.01); *H05B 33/0827* (2013.01); *Y02B 20/343* (2013.01); *Y02B 20/345* (2013.01)

(58) Field of Classification Search
CPC ......... H05B 33/0857; H05B 33/0812; H05B 33/0827
See application file for complete search history.

(56) References Cited

U.S. PATENT DOCUMENTS 6,305,818 B1 10/2001 Lebens
6,538,394 B2 * 3/2003 Volk ................... H05B 33/0887
315/291

(Continued)

FOREIGN PATENT DOCUMENTS

JP 2009152518 * 7/2009 ............. H01L 33/00
WO WO2010122463 A1 10/2010

OTHER PUBLICATIONS

Ivan Moreno; "Color Tunable Hybrid Lamp: LED-Incandescent and LED-Fluorescent", Sixth Symposium Optics Industry, Proc. of SPIE, vol. 6422, No. 1, 2007, pp. 1-7.

Primary Examiner — Tung X Le
Assistant Examiner — Raymond R Chai (57) ABSTRACT

Light source circuitry comprises a first group of one or more light emitting diodes operable to emit light of a first color, a second group of one or more light emitting diodes operable to emit light of a second color, and a third group of one or more light emitting diodes operable to emit light of a third color, wherein the first, second and third groups of light emitting diodes are arranged such that, when a fixed current arrives at the light source circuitry, the fixed current is shared between the first, second and third groups, and wherein the circuitry is configured such that a proportion of the fixed current that flows through each of the first and second groups is controllable in dependence on a received control signal and such that the remainder of the fixed current flows through the third group.

14 Claims, 5 Drawing Sheets

(56) References Cited

U.S. PATENT DOCUMENTS

| | | | | |
|---|---|---|---|---|
| 6,621,235 B2* | 9/2003 | Chang | ................ | H05B 33/0827 315/194 |
| 6,864,641 B2* | 3/2005 | Dygert | ............... | H05B 33/0815 315/194 |
| 7,122,971 B2* | 10/2006 | Yeh | .................... | H05B 33/0827 315/129 |
| 9,018,845 B2* | 4/2015 | Ge | .................... | H05B 33/0815 315/192 |
| 2003/0025120 A1* | 2/2003 | Chang | ............................ | 257/92 |
| 2006/0049782 A1 | 3/2006 | Vornsand | | |
| 2007/0080911 A1 | 4/2007 | Liu | | |
| 2007/0152909 A1 | 7/2007 | Fukuda | | |
| 2007/0205968 A1 | 9/2007 | Chen | | |
| 2008/0116817 A1* | 5/2008 | Chao et al. | .................... | 315/189 |
| 2009/0322234 A1* | 12/2009 | Chen | .................... | H05B 33/0815 315/159 |
| 2010/0164403 A1* | 7/2010 | Liu | ............................. | 315/297 |
| 2011/0080115 A1* | 4/2011 | Ge | .................... | H05B 33/0812 315/294 |
| 2011/0199019 A1 | 8/2011 | McClear | | |
| 2012/0223657 A1* | 9/2012 | Van de Ven | ....... | H05B 33/0827 315/297 |
| 2013/0154484 A1* | 6/2013 | Xu | ............................. | 315/122 |
| 2013/0278151 A1* | 10/2013 | Lear | .................... | H05B 33/0839 315/164 |

* cited by examiner

LIGHT SOURCE CIRCUITRY FOR CONTROLLING THE COLOR OF EMITTED LIGHT

CROSS-REFERENCE TO PRIOR APPLICATIONS

This application is a U.S. national stage application under 35 U.S.C. §371 of International Application No. PCT/IB2013/053619, filed on May 6, 2013, which claims priority benefit under 35 U.S.C. §119(e) of U.S. Provisional Application No. 61/646,934 filed on May 15, 2012, the contents of which are herein incorporated by reference.

FIELD OF THE INVENTION

The invention relates to light source circuitry and particularly to light source circuitry comprising light emitting diodes.

BACKGROUND OF THE INVENTION

Due to their high luminous efficacy, light emitting diodes (LEDs) are being used in an ever-increasing range of lighting applications. LEDs provide a great number of different functionalities that are not possible, or are not as easy to achieve, with conventional light bulbs. One such functionality is the ability to change the tint or color of a single light bulb. Generally, with an LED bulb this functionality is achieved by supplying the LED bulb with LEDs of a plurality of different colors, and by using pulse width modulation (PWM) to control the amount of current that is supplied to the LED's of each color. However, the use of PWM requires a power supply and circuitry that is able to cope with changing power levels and with high frequencies. This increases the monetary cost of the circuitry and can also adversely affect its electro-magnetic capability (EMC). There is, therefore, a need for an LED bulb having a changeable color or tint, but which does not use PWM to provide this functionality.

SUMMARY OF THE INVENTION

In view of the above, in a first aspect, the present invention provides light source circuitry comprising a first group of one or more light emitting diodes operable to emit light of a first color, a second group of one or more light emitting diodes operable to emit light of a second color, and a third group of one or more light emitting diodes operable to emit light of a third color. The first, second and third groups of light emitting diodes are arranged such that, when a fixed current arrives at the light source circuitry, the fixed current is shared between the first, second and third groups. The circuitry is configured such that a proportion of the fixed current that flows through each of the first and second groups is controllable in dependence on a received control signal and such that the remainder of the fixed current flows through the third group. The combined emissions of the light source circuitry can be gradually varied over a range of chromaticities, using only a single control signal. As such, changing the chromaticity of the combined emission is relatively straightforward and can be carried out using existing infrastructure, such as conventional dimmer switches regulating a mains power supply. In addition, changing the chromaticity does not require the use of PWM and so the PWM-specific requirements on the power are not necessary. Consequently, the power supply to the circuitry can be simpler. Many existing power supplies for conventional LED bulbs are configured so as to provide a constant current. As such, the light source circuitry according to the invention can be easily utilized with existing power supplies.

The light source circuitry may further comprise a first transistor connected in series with the first group of light emitting diodes, a second transistor connected in series with the second group of light emitting diodes, wherein the circuitry is configured such that a variation in the control signal causes a variation in the proportion of the fixed current that flows through the first transistor and second transistor. This is one of the ways in which a single control signal can be used to gradually vary the chromaticity. The circuitry may be configured such that a first signal based on the control signal is provided to the control terminal of the first transistor and such that a second signal based on the control signal is provided to the control terminal of the second transistor. The light source circuitry may be configured such that the first and second signals based on the control signal vary relative to one another in dependence on the control signal. The light source circuitry may further comprise a third transistor connected in series with the third group of light emitting diodes. A third signal based on the control signal may be received at the control terminal of the third transistor, wherein the third signal is always larger than the first and second signals.

The combined forward voltage of the third group of light emitting diodes may be larger than the combined forward voltage of the first group of light emitting diodes and the combined forward voltage of the second group of light emitting diodes.

The light source circuitry may be configured such that when the control signal is at a first level, the largest proportion of the fixed current flows through the third group of light emitting diodes and such that, as the control signal changes to second level, the proportions of the fixed current that flow through the first and second groups of light emitting diodes increase. The circuitry may be configured such that, as the control signal changes from the second level to a third level, the proportion of the fixed current that flows in the first group of light emitting diodes decreases, and the proportion of the fixed current that flows in the second group of light emitting diodes continues to increase.

The second group of light emitting diodes may be constituted by one or more light emitting diodes operable to emit red-colored light, the third group of light emitting diodes may be constituted by one or more light emitting diodes operable to emit white-colored light, the first group of light emitting diodes may be constituted by one or more light emitting diodes the combined emission of which is lime-colored.

The light source circuitry may be configured such that, as the control signal gradually changes from a first level to a different level, the color of the combined emissions of the first, second and third groups of light emitting diodes changes generally in accordance with the Planckian locus. The Planckian locus is the representation of different tints of white that are available using various different technologies. Colors falling on the Planckian locus are perceived by consumers to be white, but having different "warmths". As such, the light source circuitry can be used to provide subtle changes in atmosphere by varying the warmth of the emitted light. Changing the color of light along the Planckian locus can influence people's moods and their perception of the ambient atmosphere. In contrast, when deviating from the Planckian locus, people may perceive the light to be colored instead of white, and so the above advantages may not apply.

In a second aspect, the present invention provides a method of manufacturing light source circuitry comprising providing a first group of one or more light emitting diodes operable to emit light of a first color, providing a second group of one or more light emitting diodes operable to emit light of a second color, providing a third group of one or more light emitting diodes operable to emit light of third color, arranging the first, second and third groups of light emitting diodes such that, when a fixed current arrives at the light source circuitry, the fixed current is shared between the first, second and third groups, and configuring the light source such that a proportion of the fixed current that flows through each of the first and second groups is controllable in dependence on a received control signal and such that the remainder of the fixed current flows through the third group.

BRIEF DESCRIPTION OF THE DRAWINGS

Embodiments of the invention will now be described, by way of example only, with reference to the accompanying figures, in which.

DETAILED DESCRIPTION

In the following description, like reference numerals refer to like elements throughout.

Figure 1:
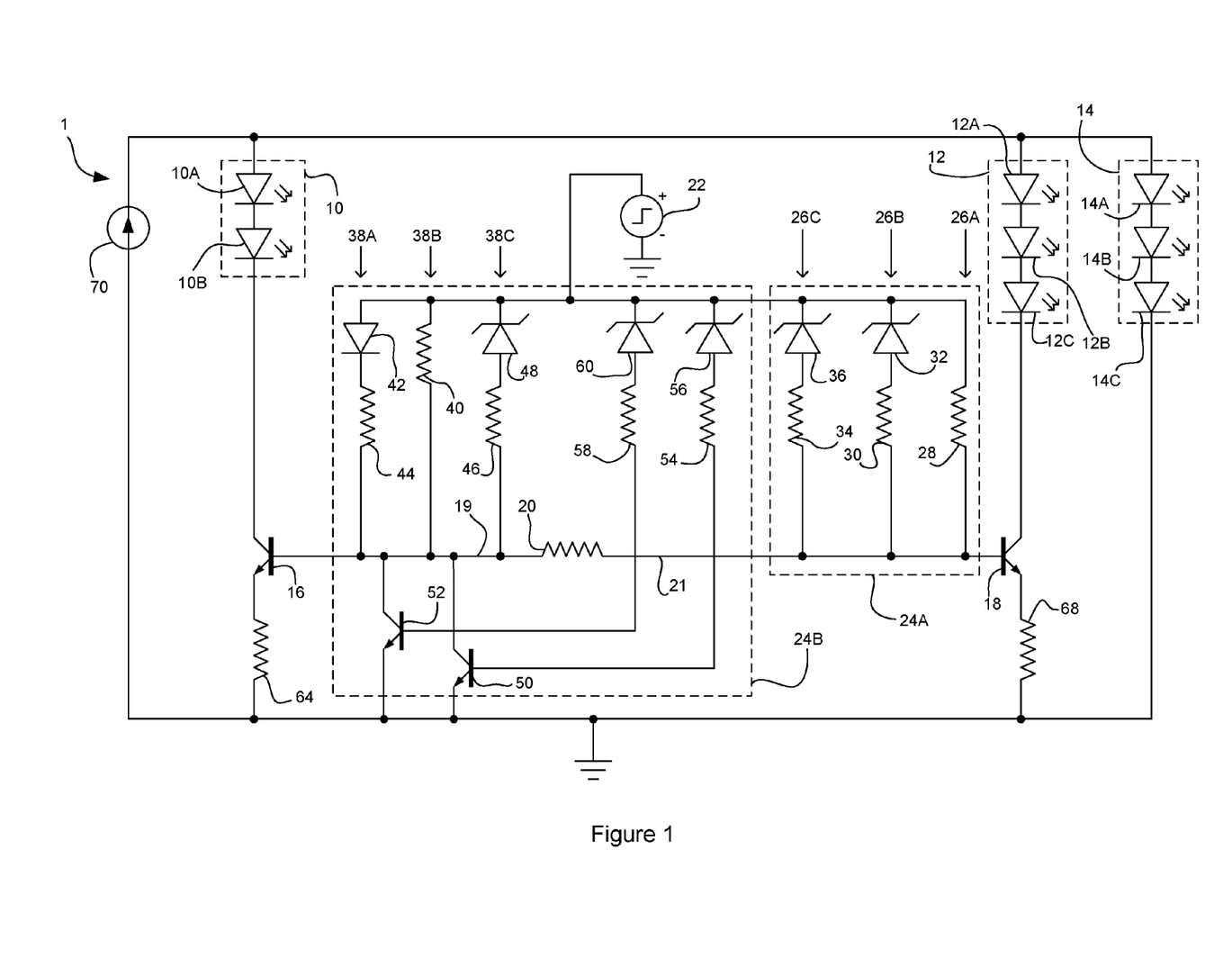
FIG. 1 is an example of light source circuitry in accordance with the present invention.

FIG. 1 is an example of light source circuitry 1 in accordance with the present invention. The light source circuitry 1 comprises plural groups of LEDs 10, 12, 14. Specifically, the light source circuitry 1 of FIG. 1 comprises a first group of LEDs 10, a second group of LEDs 12 and a third group of LEDs 14. Each of the first, second and third groups of LEDs 10, 12, 14 comprises one or more LEDs e.g. 10A, 12A, 14A. Each of the groups of LEDs 10, 12, 14 is operable to emit light of a different color. In the example of FIG. 1, the first group of LEDs 10 consists of plural LEDs 10A, 10B, in this instance two, which are operable to emit lime-colored light (hereafter referred to as lime LEDs). The second group of LEDs 12 consists of plural LEDs 12A, 12B 12C, in this example three, which are operable to emit red-colored light (hereafter referred to as red LEDs). The third group of LEDs 14 consists of plural LEDs 14A, 14B, 14C, in this instance three, which are operable to emit white-colored light (hereafter white LEDs). In this example, the LEDs within each of the first, second and third groups 10, 12, 14 are connected in series with one another.

The plural groups of LEDs 10, 12, 14 are connected in parallel with one another. As such, a fixed current arriving at the circuitry is shared among the plural groups of LEDs 10, 12, 14. The light source circuitry 1 also comprises a current source 70 which provides the fixed current. The light source circuitry 1 is configured such that a proportion of the fixed current that is provided to each of the first and second groups 10, 12 is controllable in dependence on a received control signal. The circuitry is also configured such that the remainder of the fixed current is provided to the third group 14.

In the specific example of FIG. 1, the light source circuitry 10 is configured such that when the control signal is at a first level, the majority of the fixed current flows through the white LEDs of the third group 14. As the control signal gradually moves towards a second level, the currents flowing through the lime and red LEDs of the first and second groups 10, 12 respectively both increase. Between the first and second levels, the current flowing through the lime LEDs 10A, 10B is larger than the current flowing through the red LEDs 12A, 12B, 12C. As the control signal gradually moves beyond the second level to a third level, the current in the lime LEDs 10A, 10B begins gradually to decrease, while the current in the red LEDs 12A, 12B, 12C continues to increase. The current flowing in the white LEDs 14A, 14B, 14C (i.e. the remainder of the current that is not flowing in the first and second groups 10, 12) gradually decreases as the control signal moves from the first to third levels. The current in the white LEDs 14A, 14B, 14C is nearly zero at the third level. At a point between the second and third levels, the current flowing in the second group 12 becomes larger than the current flowing in the first group 10. The light source circuitry 1 being configured in this way allows the chromaticity of the combined emissions of the first, second and third groups of LEDs 10, 12, 14 substantially to follow the Planckian locus (also known as the black body locus) as the control signal changes from the first to third levels.

The first group of LEDs 10 is connected in series with a first transistor 16. The second group of LEDs 12 is connected in series with a second transistor 18. In this example, the first and second transistors 16, 18 are n-channel bipolar junction transistors (BJTs). The base terminals of the first and second transistors 16, 18 are connected to one another via a first resistor 20. A first conductive path 19 connects the base terminal of the first transistor 16 and the first resistor 20. A second conductive path 21 connects the base terminal of the second transistor 16 and the first resistor 20. The presence of the first resistor 20 creates a dependency, so that the currents in the first and second groups of LEDs 10, 12 do not differ from one another by too much. This is achieved because the first resistor 20 limits the difference that can exist between the voltages at the base terminals of the first and second transistors 16, 18. However, in some alternative examples, the first resistor 20 may be omitted from the circuitry 1.

The light source circuitry 1 comprises a controllable voltage supply 22. This provides a voltage which acts as the control signal for varying the current that flows through the first and second groups of LEDs 10, 12. The controllable voltage supply 22 is connected to the base terminal of at least the second transistor 18 so as to vary the amount of current that flows through the second transistor 18, and thus also through the second group of LEDs 12. In this example, the controllable voltage supply is also connected to the base terminal of the first transistor 16 so as to vary the amount of current that flows through the first transistor 16, and thus also through the first group of LEDs 10.

The first group of LEDs 10 is connected to the collector terminal of the first transistor 16. The emitter terminal of the first transistor 16 is connected to ground, via a second resistor 64. The second group of LEDs 12 is connected to the collector terminal of the second transistor 18. The emitter terminal of the second transistor 18 is connected to ground, via a third resistor 68. The resistances of the second and third resistors 64, 68 are the same. The presence of the second and third resistors 64, 68 makes the circuit more stable over a range of different temperatures and between different instances of the light source circuitry 1. This is because their presence reduces the sensitivity to base-emitter voltage drift.

The third group of LEDs 14 is connected to ground. Whereas the current flowing through the first and second groups of LEDs 10, 12 is dependent on the control signal, the current through the third group of LEDs 14 is not directly controllable, but instead comprises the remainder of the first current that does not flow through the first and second groups 10, 12.

The controllable voltage supply 22 is connected to the base terminal of the second transistor 18 via first control circuitry 24A. The controllable voltage supply 22 is connected to the base terminal of the first transistor 16 via second control circuitry 24B. The first and second control circuitries 24A, 24B are configured so as to ensure that the combined light emissions of the first, second and third groups of LEDs 10, 12, 14 follows the Planckian locus as closely as possible for as long as possible. In the example of FIG. 1, this is achieved using analogue components, including diodes, resistors and transistors. However, it will be appreciated that it may instead be achieved using a microprocessor configured to receive a single voltage and to use this voltage to supply a suitable current to the base terminal of at least one of the first and second transistors 16, 18. Alternatively, this may be achieved using operational amplifiers.

In FIG. 1, the first control circuitry 24A comprises one or more, in this instance three, parallel circuit branches 26A, 26B, 26C connected between the controllable voltage supply 22 and the second conductive path 21. A first branch 26A comprises a fourth resistor 28. A second branch 26B comprises a fifth resistor 30 in series with a reverse-biased first Zener diode 32. A third branch 26C comprises a sixth resistor 34 in series with a reverse-biased second Zener diode 36. The presence of the first and second Zener diodes 32, 36 means that a significant current flows through the second and third branches 26B, 26C only when the potential difference between the controllable voltage supply 22 and the second conductive path 21 exceeds a predetermined value (i.e. the reverse voltage of the Zener diodes 32, 36). In contrast, current always flows through the first branch 26A as long as a potential difference exists. In this example, the first branch 26A is connected to the second conductive path 21 at a location nearest to the base terminal of the second transistor 18. The third branch 26C is connected to the second conductive path 21 at a location nearest to the first resistor 20. The second branch 26B is connected to the second conductive path 21 at a location between the locations at which the first and third branches 26A, 26C are connected to the second conductive path 21.

The second control circuitry 24B comprises one or more branches 38A, 38B, 38C, in this instance three, connected in parallel between the controllable voltage supply 22 and the first conductive path 19. A first branch 38A comprises a seventh resistor 40. A second branch 38B comprises a forward biased conventional diode 42 connected in series with an eighth resistor 44. A third branch 38C comprises a ninth resistor 46 in series with a third reverse-biased Zener diode 48. The presence of the first conventional diode in the second branch 38B means that a significant current will only flow in the second branch when the potential difference between the controllable voltage supply and the first conductive path 19 is above the forward voltage of the diode 42. The presence of the third Zener diode 48 means that a significant current will only flow in the third branch 38C when the potential difference is greater than the reverse voltage of the third Zener diode 48. A current will always flow in the first branch 38A as long as a potential difference exists. In this example, the second branch 38B is connected to the first conductive path 19 at a location nearest to the base terminal of the first transistor 16. The third branch 38C is connected to the first conductive path 19 at a location nearest to the first resistor 20. The first branch 38A is connected to the first conductive path 19 at a location between the locations at which the second and third branches 38B, 38C are connected to the first conductive path 19.

The second control circuitry 24B also comprises first and second control transistors 50, 52. In this example, the first and second control transistors 50, 52 comprise p-channel BJTs. The controllable voltage supply 22 is connected to the base terminal of the first control transistor 50 via a tenth resistor 54 connected in series with a fourth Zener diode 56. The controllable voltage supply 22 is connected to the base terminal of the second control transistor 52 via an eleventh resistor 58 connected in series with a fifth Zener diode 60. The collector of the first control transistor 50 is connected to the first conductive path 19, in this example at a location between the locations at which the first and third branches 38A, 38C of the second control circuitry 24B connect to the first conductive path 19. The emitter of the first control transistor 50 is connected to ground. The collector of the second control transistor 52 is connected to the base terminal of the first transistor 16, in this example at a location between the locations at which the first and second branches 38A, 38B of the second control circuitry 24B connect to the first conductive path 19. The emitter of the second control transistor 50 is connected to ground. The resistances of the tenth and eleventh resistors 45, 58 may be the same.

The presence of the first and second control transistors 50, 52 means that, when a potential difference between the base terminals of the first and second control transistors 50, 52 and the controllable voltage supply 22 is in excess of the reverse voltages of the fourth and fifth Zener diodes 56, 60, some current will flow through first and second control transistors from the first conductive path. As such, less current flows to the base terminal of the first transistor 16, and so less current flows through the collector-emitter junction of the first transistor 16 which means less current also flows through the first group of LEDs 10, thus reducing the intensity of the light emitted by the first group of LEDs 10.

Each of the first to fifth Zener diodes 32, 36, 48, 56, 60 may have a different reverse voltage. The reverse voltages of the Zener diodes 32, 36, 48, 56, 60 are selected based on the range of voltages of the control supply. Each of the Zener diodes is responsible for a change in the gradient of the chromaticity graph (see FIG. 2) of the light source circuitry 1. As such, the inclusion of the Zener diodes 32, 36, 48, 56, 60 allows the light source circuitry to track the Planckian Locus over a wider range of chromaticities. This will be apparent from a comparison of FIGS. 2 and 4.

Although not shown in the example of FIG. 1, the light source circuitry 1 may also comprise a current protection branch connected between the current source 70 and ground. Such a current protection branch may be connected in parallel with the first, second and third groups of LEDs 10, 12, 14. The current protection branch may comprise at least a resistor connected in series with a reverse-biased Zener diode. When, the potential difference between the current source 70 and ground exceeds the reverse voltage of the Zener diode, the current protection branch begins to conduct current. This reduces the amount of current that can flow through the first, second and third groups of LEDs 10, 12, 14 thereby protecting the LEDs against damage due to excessive currents.

In one example, the electrical components shown in FIG. 1 have the following electrical characteristics. It will be appreciated, however, that the below characteristics are examples only, and that components having different characteristics may instead be used:

resistance of the first resistor 20=15,000 Ohms (Ω);
resistance of the second resistor 64=0.68Ω;
resistance of the third resistor 68=0.68Ω;
resistance of the fourth resistor 28=2,400Ω;
resistance of the fifth resistor 30=1,800Ω;
resistance of the sixth resistor 32=220,000Ω;
resistance of the seventh resistor 40=4,200Ω;
resistance of the eighth resistor 44=1100Ω;
resistance of the ninth resistor 46=220,000Ω;
resistance of the tenth resistor 54=82,000Ω;
resistance of the eleventh resistor 58=82,000Ω;
forward voltages of the lime LEDs 10A, 10B=3 Volts (V) each;
forward voltages of the red LEDs 12A, 12B, 12C=2.4V each;
forward voltages of the white LEDs 14A, 14B, 14C=3V each;
forward voltage of the diode 42=0.6V;
reverse voltage of the first Zener diode 32=3.3V
reverse voltage of the second Zener diode 36=4.7V
reverse voltage of the third Zener diode 48=5.1V
reverse voltage of the fourth Zener diode 56=9.1V
reverse voltage of the fifth Zener diode 60=15V; and
current provided by current source 70=700 mA.

Table 1, below, shows the currents flowing through the lime, red and white LEDs in light source circuitry 1 having the above characteristics for a varying control signal:

TABLE 1

| Control Signal (V) | $I_{LIME}$ (A) | $I_{RED}$ (A) | $I_{WHITE}$ (A) |
|---|---|---|---|
| 1.0 | 0.012 | 0.015 | 0.673 |
| 1.5 | 0.036 | 0.03 | 0.634 |
| 2.0 | 0.056 | 0.04 | 0.604 |
| 2.5 | 0.086 | 0.055 | 0.559 |
| 3.0 | 0.125 | 0.075 | 0.5 |
| 3.5 | 0.173 | 0.1 | 0.427 |
| 4.0 | 0.221 | 0.13 | 0.349 |
| 4.5 | 0.252 | 0.165 | 0.283 |
| 5.0 | 0.293 | 0.21 | 0.197 |
| 5.5 | 0.318 | 0.255 | 0.127 |
| 6.0 | 0.323 | 0.305 | 0.072 |
| 6.5 | 0.326 | 0.35 | 0.024 |
| 7.0 | 0.298 | 0.38 | 0.022 |
| 7.5 | 0.28 | 0.41 | 0.01 |
| 8.0 | 0.25 | 0.44 | 0.01 |

From Table 1 it can be seen that, in this example, the first control signal level is between 1.0 and 1.5V. The second control signal level, at which the current flowing through the lime LEDs 10A, 10B, 10C, begins to drop is located between 6.5V and 7.0V.

Table 2, below, shows the chromaticity and the flux levels of the combined emissions of the first, second and third groups of LEDs 10, 12, 14 as the control signal changes gradually from a first level to the third level.

TABLE 2

| Control Signal (V) | $C_x$ | $C_y$ | Flux (Lumen) |
|---|---|---|---|
| 1.0 | 0.333774 | 0.343104 | 450.8929274 |
| 1.5 | 0.341650 | 0.349198 | 465.1289412 |
| 2.0 | 0.346767 | 0.353348 | 472.9506647 |
| 2.5 | 0.353973 | 0.358896 | 481.0644331 |
| 3.0 | 0.363155 | 0.365567 | 487.3098279 |
| 3.5 | 0.374633 | 0.373591 | 490.2112517 |
| 4.0 | 0.388160 | 0.381987 | 487.529364 |
| 4.5 | 0.402408 | 0.388265 | 478.5973982 |
| 5.0 | 0.423588 | 0.398195 | 462.2534738 |
| 5.5 | 0.446396 | 0.407129 | 440.775934 |
| 6.0 | 0.472420 | 0.413898 | 413.0114279 |
| 6.5 | 0.503973 | 0.422884 | 379.8113722 |
| 7.0 | 0.513653 | 0.417157 | 364.758582 |
| 7.5 | 0.531780 | 0.415718 | 342.1999935 |

From Table 2, it can be seen that the flux levels produced by the light source circuitry of FIG. 1 is reasonably constant. The variation in the flux levels at different control signals is caused by the differences in efficiency between the LEDs of different colors.

Figure 2:
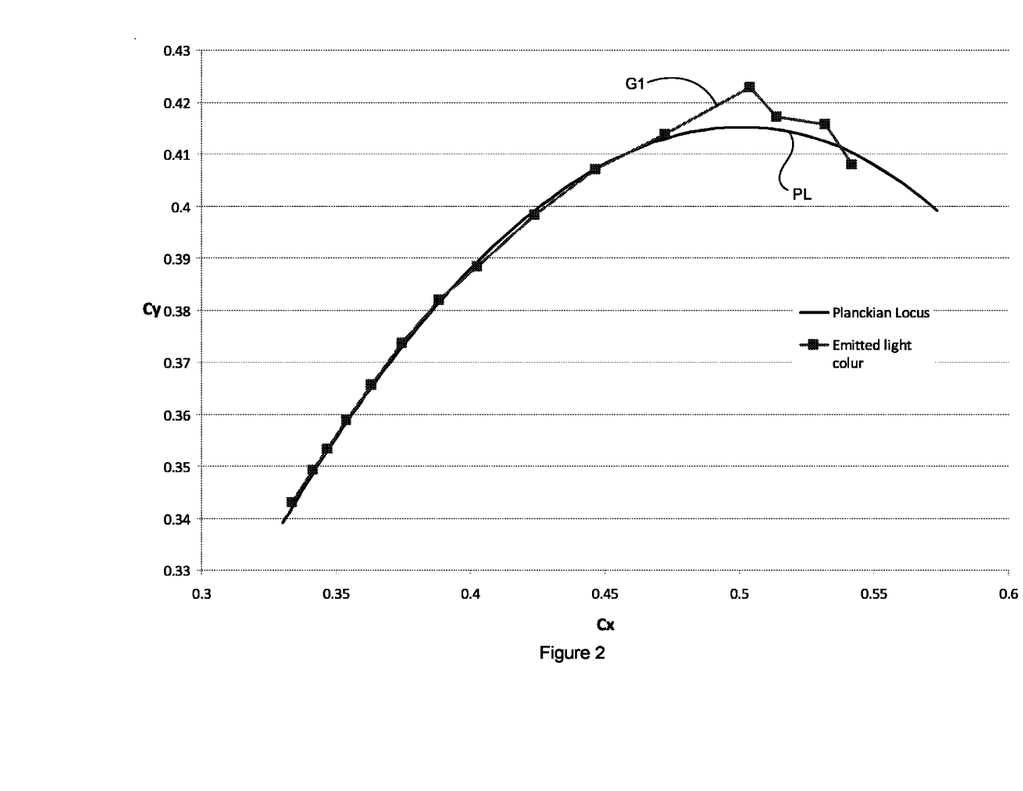
FIG. 2 is a graph illustrating the chromaticity of the light output by the circuitry of FIG. 1, when receiving various different control signals.

The chromaticities of Table 2 can be seen in graphical form in FIG. 2 and are shown by the squares connected by the line marked G1. FIG. 2 also shows, by way of comparison, the Planckian locus, which is denoted by the line marked PL. It can, thus, be seen that the chromaticity of the light source system substantially follows the Planckian locus.

As will be understood from the above description, light source circuitry in accordance with the present invention allows the tint or color of light produced by the light source circuitry to be varied without the need to use PWM. In addition, it requires only a variation in a single control signal to obtain a wide range of different tints or colors, which in some embodiments follow closely the Planckian locus. The structural simplicity of the light source circuitry, and the fact that it needs only a single control signal to vary the tint across a wide range of chromaticities, means that the cost of manufacture of the light source circuitry and any appliance, such as a bulb, which includes the light source circuitry can remain relatively low.

Figure 3:
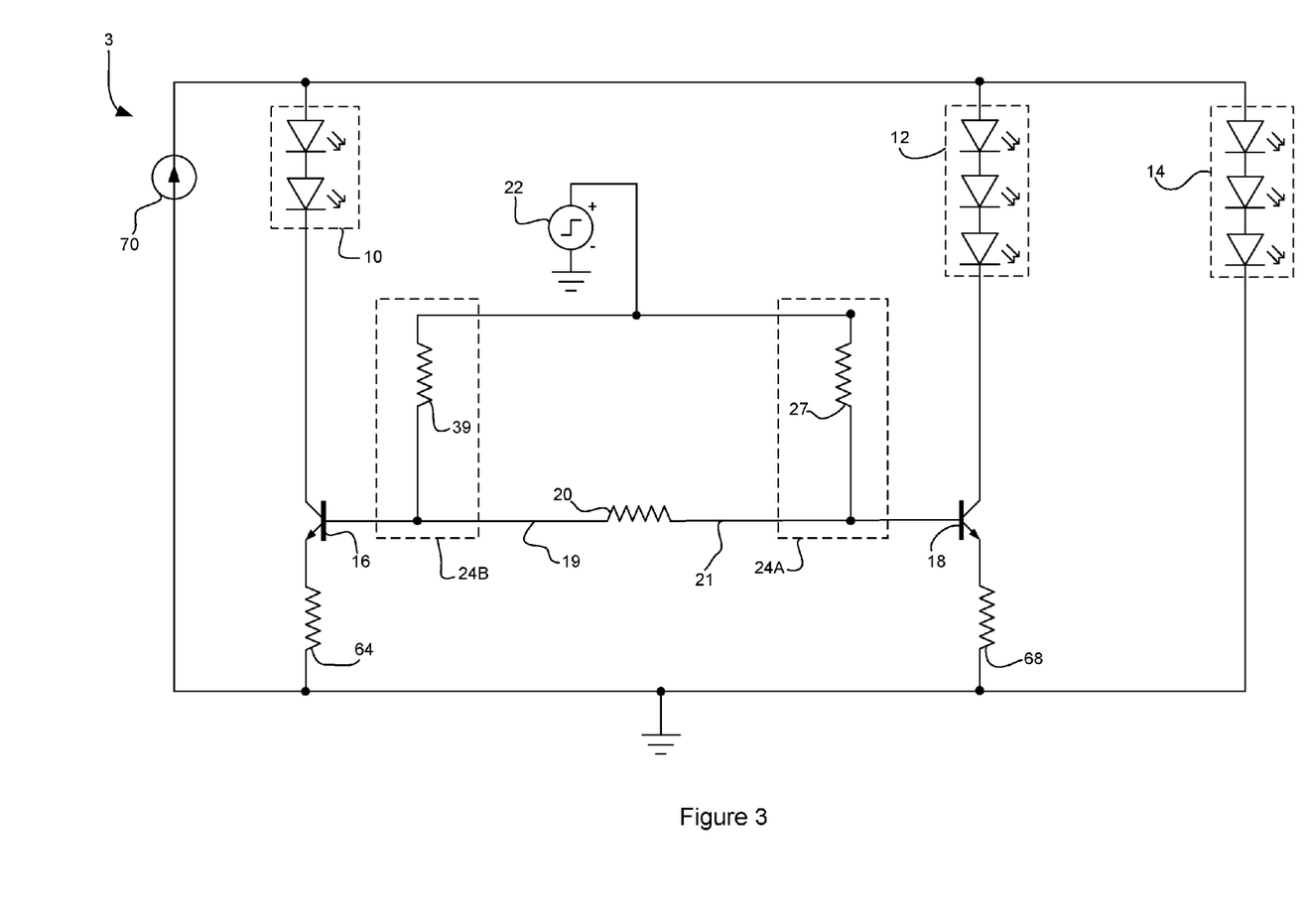
FIG. 3 is an alternative example of light source circuitry in accordance with the present invention.

FIG. 3 shows an uncompensated version 3 of the light source circuitry of FIG. 1. The uncompensated light source circuitry 3 is substantially the same as the circuitry 1 of FIG. 1 except that it includes much simplified control circuitries 24A, 24B. Specifically, the first control circuitry 24A is constituted by a resistor 27 connected between the controllable voltage supply 22 and the second conductive path 21. The second control circuitry 24B is constituted by a resistor 39 connected between the controllable voltage supply 22 and the first conductive path 21.

Figure 4:
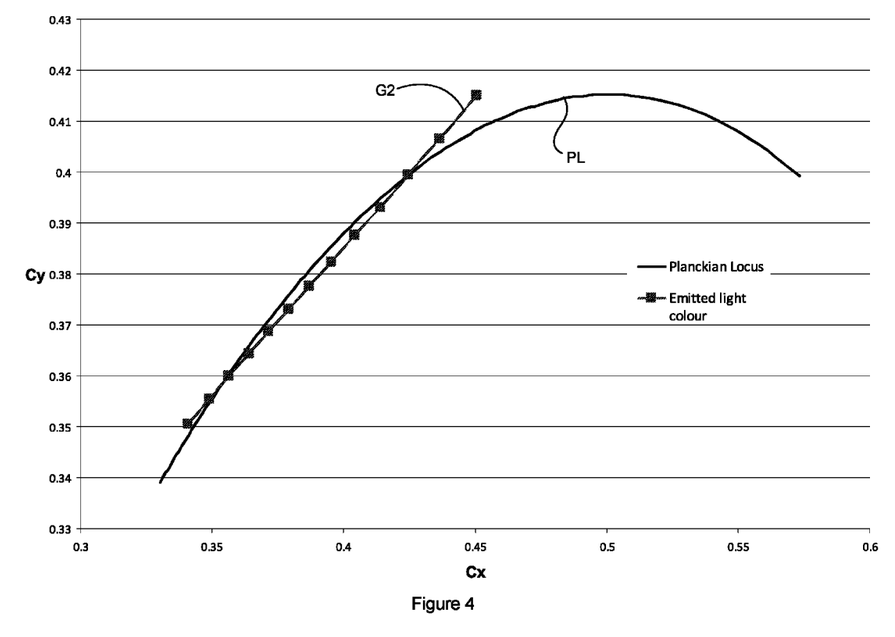
FIG. 4 is a graph illustrating the chromaticity of the light output by the circuitry of FIG. 3 when receiving various different control signals.

FIG. 4 shows a graph of the chromaticity of the combined emissions of light source circuitry 3 of FIG. 3 (denoted G2) relative to the Planckian Locus (denoted PL). As can be seen, the combined emissions still track the Planckian Locus, but over a shorter range of chromaticities. For the generation of the chromaticities shown in FIG. 4, the electrical characteristics of the components of the light source circuitry 3 were the same as the characteristics of the corresponding components listed above with reference to FIG. 1 (i.e. the resistances of the resistors 20, 64 and 68 were the same, as well as the forward voltages of the LEDs 10, 12, 14, and the voltage and current of the controllable voltage and current sources 22, 70 respectively). The resistance of the resistor 27 of the first control circuitry 24A was 4,200Ω. The resistance of the resistor 39 of the second control circuitry 24B was 2,400Ω.

Figure 5:
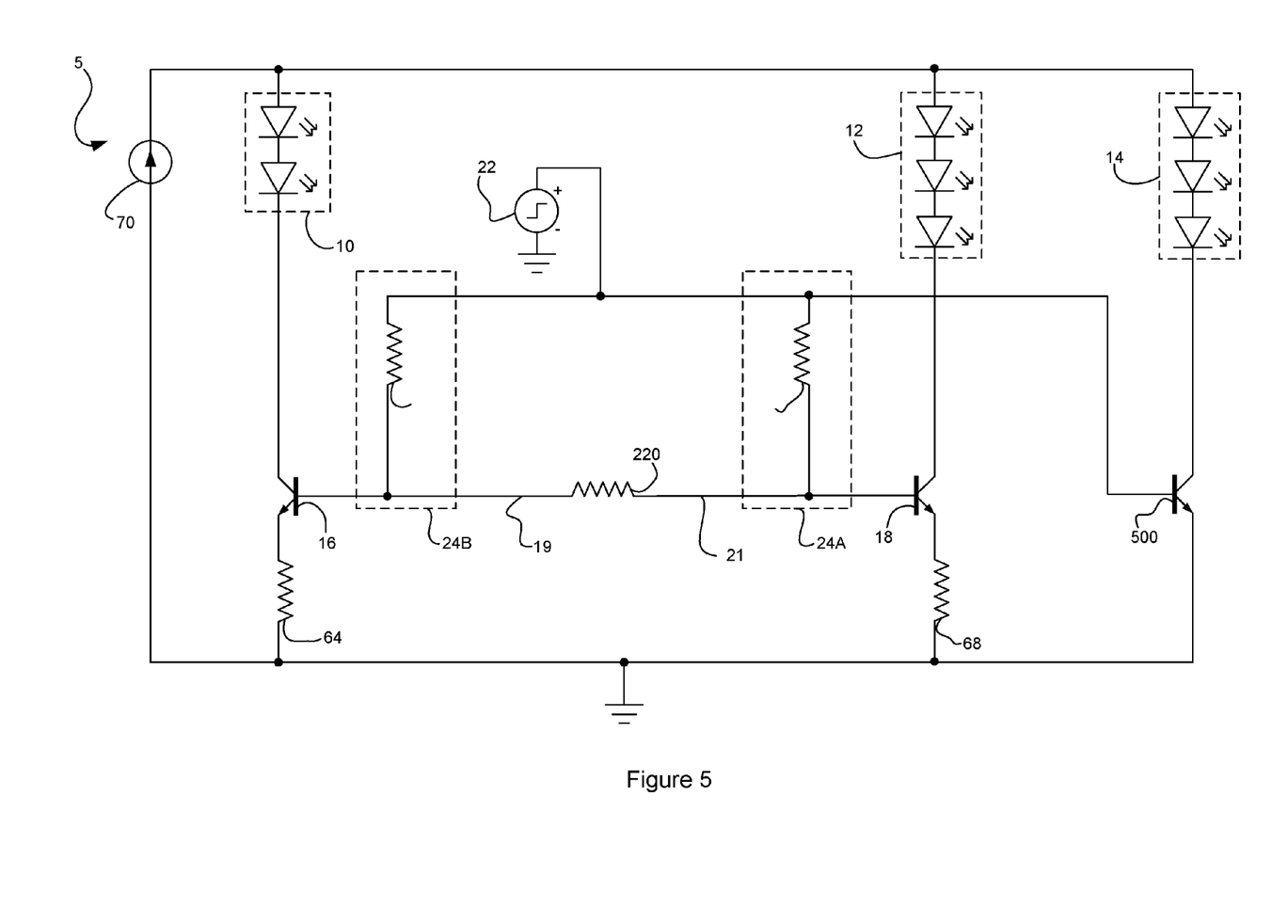
FIG. 5 is an alternative example of light source circuitry in accordance with the present invention.

FIG. 5 is an example of another alternative arrangement of light source circuitry 150 in accordance with the invention.

The light source circuitry 5 of FIG. 5 is substantially the same as the uncompensated light source circuitry of FIG. 3. However, the light source circuitry 5 of FIG. 5 also comprises a third transistor 500 connected in series with the third group of LEDs 14. In the example of FIG. 5, the third group of LEDs are connected to the collector terminal of the third transistor 500. The emitter terminal of the third transistor 500 is connected to ground. The controllable voltage supply 22 is connected to the base terminal of the third transistor 500. The connection between the controllable voltage supply 22 and the base terminal of the third transistor 500 may include no resistor, or may include a resistor that is of significantly lower resistance than the resistors 27, 39 of the first and second control circuitries 24A, 24B. This means that a higher current flows through the base-emitter junction of the third transistor than through the base-emitter junctions of the first and second transistors 16, 18. As such, the current flow through the collector-emitter junction of the third transistor 500 is less restricted than are the current flows through the collector-emitter junctions of the first and second transistors 16, 18. At low control signals, the current flows through the base-emitter junctions of the first to third transistors 16, 18, 500 are such that most of the current supplied to the circuitry 5 flows through the third transistor 500, and so also through the third group of LEDs 14.

Similarly to the examples of FIGS. 1 and 3, the light source circuitry 5 of FIG. 5 is configured such that when the control signal is at a first level, the majority of the current flows through the white LEDs of the third group 14. As the control signal gradually moves towards a second level, the currents flowing through the lime and red LEDs of the first second groups 10, 12 respectively both increase. The current flowing through the LEDs in the first group 10 is larger than the current flowing through the LEDs of the second group 12. In this example, the current flowing through the second group of LEDs 12 never becomes larger than the current flowing through first group of LEDs 10. As such, the combined emission of the light source circuitry 5 follows the Planckian locus over a shorter range of chromaticities than does the example of FIG. 1. The current flowing in the third group 14 (i.e. the remainder of the current that is not flowing in the first and second groups 10, 12) gradually decreases as the control signal moves from the first to third levels. The light source circuitry 5 of FIG. 5 operates in this way at least in part because the combined forward voltage of the third group of LEDs 14 is greater than the forward voltages of the first and second groups of LEDs 10, 12. The forward voltage of the second group of LEDs 12 is preferably similar to the forward voltage of the first group of LEDs 10.

In one example, the characteristics of the components of the circuitry 5 of FIG. 5 are substantially the same as those in FIG. 3, except that the resistance of the resistor 27 of the first control circuitry 24A is 2,400Ω and the resistance of the resistor 39 of the second control circuitry 24B is 3000Ω.

Although the specific examples of FIGS. 1, 3 and 5 show the fixed current source 70 as part of the light source circuitry 1, 3, 5, it will be appreciated that this may be separable. As such, the circuitry 1, 3, 5 may instead be configured to be connectable to (and so not actually including) the fixed current source 70. The fixed current source 70 may comprise, for example, a mains-power flyback converter. Alternatively, the fixed current source 70 may comprise any other means for providing a fixed current to the light source circuitry 1, 3, 5.

Similarly, the controllable voltage source 22 for providing the control signal may be separate or separable from the light source circuitry 1, 3, 5. The controllable voltage source 22 may comprise, for example, a rectified mains signal with, for example, an output voltage between 1V and 10V.

Although the examples of FIGS. 1, 3 and 5 show the groups of LEDs 10, 12, 14 connected to the collector terminals of the various transistors 16, 18, 500, it will be understood that the groups of LEDs may instead be connected to the emitter terminals. Also, although the specific examples include n-channel BJTs, in some examples p-channel BJTs may be used. Alternatively, field effect transistors may be used. In examples which include field-effect transistors, where a connection is described above as being to the base terminal, the connection is instead to the gate terminal. Similarly, where a connection is described as being with the emitter terminal or collector terminal, in examples including field-effect transistors the connection is instead to the drain or source terminals respectively. The gate terminal and the base terminal of field-effect transistors and BJTs respectively may be collectively referred to herein as control terminals. This is because a signal provided to those terminals controls the current that flows through the transistor.

It will be appreciated, that each of the groups of LEDs 10, 12, 14 may include LEDs of different colors, the combined emissions of which result in light of a desired color. For example, the first group of LEDs 14, instead of all being Lime LEDs, may be comprised of a mixture of green LEDs and amber LEDs to produce a lime-colored combined emission.

In the examples above, the colors and quantities of LEDs are selected so as to be able to produce a combined emission that closely follows the Planckian locus. However, in other examples, different colored LEDs to those described above may used. Similarly, different numbers of LEDs to those described above may be used. Also, although the Figures show the LEDs of each group connected in series, in some alternatives the LEDs of each group may be connected in parallel, or in a combination of in series an in parallel. It will be obvious to the skilled person that the light source circuitry according to the present invention, may be used to create LED light sources such as retrofit lamps, LED luminaires, or lamp for professional applications such as lamps used in theaters or lamps for illuminating steps.

It will be appreciated that the term "comprising" does not exclude other elements or steps and that the indefinite article "a" or "an" does not exclude a plurality. A single processor may fulfill the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. Light source circuitry comprising:
    a first group of one or more light emitting diodes configured to emit light of a first color;
    a second group of one or more light emitting diodes configured to emit light of a second color;
    a third group of one or more light emitting diodes configured to emit light of a third color, wherein the first, second and third groups of light emitting diodes are configured such that, when a fixed current arrives at the light source circuitry, the fixed current is shared between the first, second and third groups;
    a first transistor connected in series with the first group of light emitting diodes; and
    a second transistor connected in series with the second group of light emitting diodes, wherein the first transistor and second transistor are configured such that a variation in a single received control signal causes a variation in a first proportion of the fixed current that flows through the first transistor and causes a variation in a second proportion of the fixed current that flows through the second transistor, such that the proportions of the fixed current that flow through each of the first and second groups is controllable in dependence on the single received control signal and such that the remainder of the fixed current flows through the third group;
    wherein the light source circuitry is configured such that a first signal based on the control signal is provided to the control terminal of the first transistor and such that a second signal based on the control signal is provided to the control terminal of the second transistor;
    wherein the light source circuitry is further configured such that, when the control signal is at a first level, the largest proportion of the fixed current flows through the third group of light emitting diodes and such that, as the control signal changes to a second level, the proportions of the fixed current that flow through the first and second groups of light emitting diodes increase.

2. The light source circuitry of claim 1, wherein the light source circuitry is configured such that the first and second signals based on the control signal vary relative to one another in dependence on the control signal.

3. The light source circuitry of claim 1, further comprising a third transistor connected in series with the third group of light emitting diodes.

4. The light source circuitry of claim 3, wherein a third signal based on the control signal is received at the control terminal of the third transistor, wherein the third signal is always larger than the first and second signals.

5. The light source circuitry of claim 1, wherein the combined forward voltage of the third group of light emitting diodes is larger than the combined forward voltage of the first group of light emitting diodes and the combined forward voltage of the second group of light emitting diodes.

6. The light source circuitry of claim 1, wherein the light source circuitry is configured such that, as the control signal changes from the second level to a third level, the proportion of the fixed current that flows in the first group of light emitting diodes decreases, and the proportion of the fixed current that flows in the second group of light emitting diodes continues to increase.

7. The light source circuitry of claim 1, wherein:
    the second group is constituted by one or more light emitting diodes operable to emit red-colored light;
    the third group is constituted by one or more light emitting diodes operable to emit white-colored light; and
    the first group of light emitting diodes is constituted by one or more light emitting diodes the combined emission of which is lime-colored.

8. The light source circuitry of claim 1, wherein the light source circuitry is configured such that, as the control signal gradually changes from a first level to a different level, the color of the combined emissions of the first, second and third groups of light emitting diodes changes generally in accordance with the Planckian locus.

9. A LED light source comprising light source circuitry according to claim 1.

10. A method of manufacturing light source circuitry comprising:
    providing a first group of one or more light emitting diodes configured to emit light of a first color;
    providing a second group of one or more light emitting diodes configured to emit light of a second color;
    providing a third group of one or more light emitting diodes configured to emit light of third color,
    configuring the first, second and third groups of light emitting diodes such that, when a fixed current arrives at the light source circuitry, the fixed current is shared between the first, second and third groups;
    providing a first transistor connected in series with the first group of light emitting diodes;
    providing a second transistor connected in series with the second group of light emitting diodes; and
    configuring the first transistor and the second transistor such that a variation in a single received control signal causes a variation in a first proportion of the fixed current that flows through the first transistor and causes a variation in a second proportion of the fixed current that flows through the second transistor, such that the proportions of the fixed current that flow through each of the first and second groups is controllable in dependence on the single received control signal and such that the remainder of the fixed current flows through the third group;
    configuring the light source circuitry such that, when the control signal is at a first level, the largest proportion of the fixed current flows through the third group of light emitting diodes and such that, as the control signal changes to a second level, the proportions of the fixed current that flow through the first and second groups of light emitting diodes increase; and
    providing a first signal based on the control signal to a control terminal of the first transistor and providing a second signal based on the control signal to a control terminal of the second transistor.

11. Light control circuitry comprising:
    a controllable voltage supply configured to provide a single control signal;
    a first transistor connected in series with a first group of light emitting diodes configured to emit light of a first color; and
    a first control circuitry comprising at least one parallel circuit branch connected to the controllable voltage supply and the first transistor;
    a second transistor connected in series with a second group of light emitting diodes configured to emit light of a second color, and in parallel with a third group of light emitting diodes configured to emit light of a third color;

a second control circuitry comprising at least one parallel circuit branch connected to the controllable voltage supply and to the second transistor;

wherein a fixed current is shared between the first, second and third groups, and wherein the first and second control circuitry is configured such that a variation in the single control signal causes a variation in a first proportion of the fixed current that flows through the first transistor and causes a variation in a second proportion of the fixed current that flows through the second transistor, wherein the first and second control circuitry is configured such that a first signal based on the control signal is provided to the control terminal of the first transistor and such that a second signal based on the control signal is provided to the control terminal of the second transistor.

12. The light control circuitry of claim 11, wherein the first and second control circuitry is configured such that, when the control signal is at a first level, the largest proportion of the fixed current flows through the third group of light emitting diodes and such that, as the control signal changes to second level, the proportions of the fixed current that flow through the first and second groups of light emitting diodes increase.

13. The light control circuitry of claim 11, wherein the controllable voltage supply is connected to the second transistor via the first control circuitry and the controllable voltage supply is connected to the first transistor via the second control circuitry.

14. The light control circuitry of claim 11, wherein the first and second control circuitry is configured such that, as the control signal gradually changes from a first level to a different level, the color of the combined emissions of the first, second and third groups of light emitting diodes changes generally in accordance with the Planckian locus.

* * * * *